May 13, 1930.  O. ROACH  1,758,240
CAMERA SUPPORT
Filed July 9, 1928  2 Sheets-Sheet 1

INVENTOR.
Otto Roach
BY
ATTORNEY.

May 13, 1930.  O. ROACH  1,758,240
CAMERA SUPPORT
Filed July 9, 1928  2 Sheets-Sheet 2
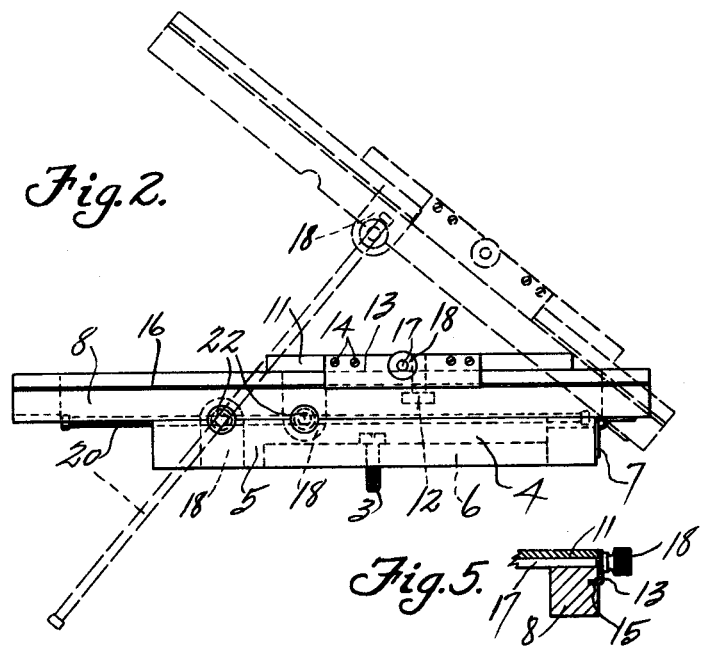
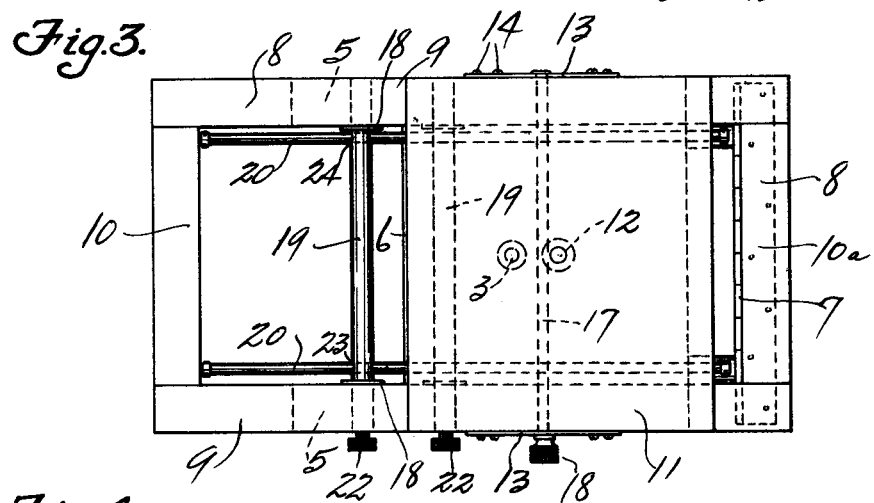
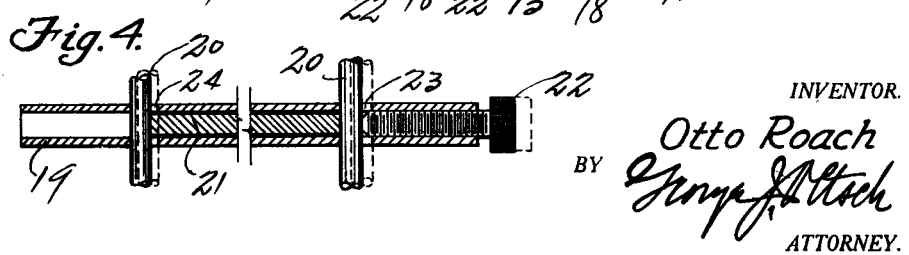
INVENTOR.
Otto Roach
BY
ATTORNEY.

Patented May 13, 1930

1,758,240

UNITED STATES PATENT OFFICE

OTTO ROACH, OF SOUTH BEND, INDIANA, ASSIGNOR OF TWO-THIRDS TO STAPLES STUDIO, INCORPORATED, OF SOUTH BEND, INDIANA

CAMERA SUPPORT

Application filed July 9, 1928. Serial No. 291,263.

The invention relates to camera mountings, and has for its object to provide a device of this character which may be readily and easily attached to any standard camera tripod, and by the use of which pictures may be taken at an angle, such as tilting up or down, and which device allows of close angular adjustment and will securely hold the camera in the desired tilted position.

A further object is to provide in a device of this character a base attachable to a tripod, a tiltable frame carrying a camera support shiftably mounted thereon, and means for holding the tiltable frame in an adjustable tilted position, comprising prop rods disposed at the opposite sides of the base and tiltable frame and slidably extending through rotatable members carried by the base and tiltable frame; and by means of which said prop rods are adapted to be clamped and held against movement.

A further object is to provide a device of this character which is simple of construction, cheap of manufacture, and adapted to be collapsed into a small, compact and easily handled unit.

With the above and other objects in view, the invention resides in the particular combination and arrangement of parts as hereinafter set forth, shown in the drawing, described and claimed, it being understood that changes in the precise embodiment of the invention may be made within the scope of what is claimed without departing from the spirit of the invention.

In the drawings:

Figure 2 is a side elevation of the device showing the device in tilted position in dotted lines.

Figure 3 is a top plan view of the device.

Figure 4 is a vertical sectional view of the device for clamping the prop rods.

Figure 5 is a fragmentary transverse sectional view showing the means for adjustably clamping the camera against movement on the tiltable frame.

Figure 1:
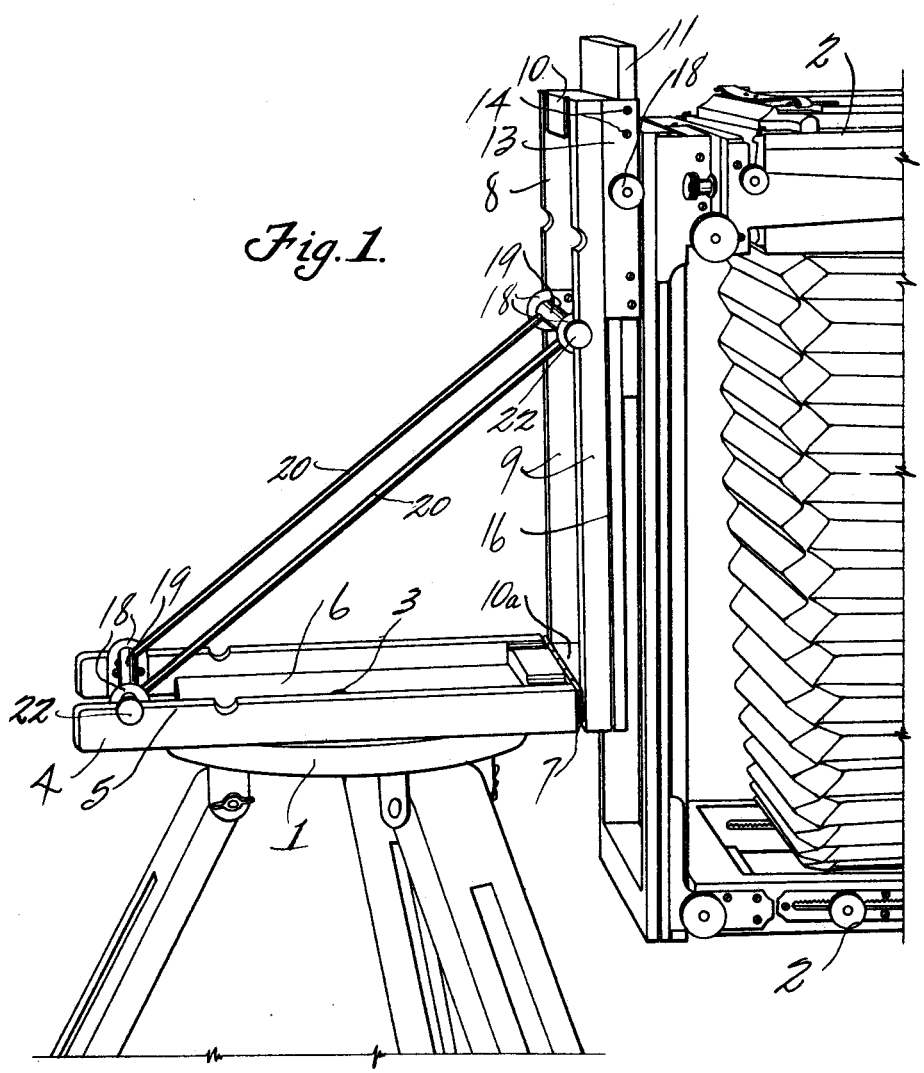
Figure 1 is a perspective view of the device showing the device mounted on a tripod and carrying a camera.

Referring to the drawings, the numeral 1 designates a tripod and 2 a camera, each of which may be of any suitable manufacture or construction. The improved mounting is adapted to be mounted and secured on the tripod, as by means of a screw 3, and comprises a base member 4, which is in the form of a U-shaped frame 5, and between and to the inner opposite sides of the side members of which frame is secured a bottom piece 6 which terminates short of the open end of the frame, and which bottom piece 6 carries the screw 3.

Pivotally secured to the cross bar of the frame 5 of the base member 4 by means of the hinge 7, is a tiltable frame 8 comprised of the side bars 9 and the end bars 10 and $10^a$, to which latter bar one plate of the hinge 7 is secured. Slidably mounted on the tiltable frame 8 is a slidable camera support 11 which carries a screw 12 by means of which the camera is secured to the camera support.

Carried by each side of the camera support 11 and overlying the sides of the tiltable frame 8 are flexible metal clamping plates 13 secured to the sides of the camera support by means of the screws 14. The free lower edge of each of the clamping plates 13 is formed with an inwardly bent flange 15 which extends into a groove 16, formed in the outer side of each of the side bars 9 of the tiltable frame 8, and by means of which the camera support 11 has a slidable relation with the tiltable frame 8 to permit adjustment thereof longitudinally of said frame, and which clamping plates, by virtue of their flanges engaging with said grooves, prevent separation between the camera support and the tiltable frame. Extending through the camera support 11 transversely thereto is a rod 17, one end of which is secured to one of the clamping members 13, and the other end of which is threaded to receive a thumb nut 18, which is adapted to be screwed against the adjacent clamping plate 13, thereby drawing the clamping plates in the direction of each other and in engagement with the side bars 9 of the tiltable frame 8, thus clamping the camera support 11 against movement on said tiltable frame.

To the opposite inner sides of the side bars of the U-shaped frame 5 at a point near the open end thereof, and to the inner sides of the side bars 9 of the frame 8 substantially intermediate its ends, are secured apertured metal plates 18, which form bearings for rotatably supporting the tubular rods 19 extending through said apertures and transversely disposed with respect to said base frame 5 and the tiltable frame 8. Longitudinally disposed with respect to said tiltable frame 8 and slidably extending through spaced holes 23 and 24 formed in said tubular rods 19 are prop rods 20. Slidably disposed in each of the tubular rods 19 and between said prop rods is a thrust rod 21 the length of which is slightly greater than the distance between the spaced holes 23 and 24, and threaded into one end of each of the tubular members 19 is a thumb screw 22. The thumb screw 22 is adapted to engage the adjacent prop rod 20, which extends through the slightly oval hole 23, and to push the same against the thrust rod 21 which has engagement with the other prop rod 20, and which is adapted to push the other prop rod against the side of the hole 24. In this manner both prop rods 20 are adapted to be clamped against movement to the tubular rods 19 by means of an adjustment of the thumb screws 22.

In practice the device is usually secured to a tripod, as by means of the screw 3, and the camera is secured to the slidable camera support 11 by means of a screw 12, the camera support being adapted for adjustment to and fro on the tiltable frame 8. The tiltable frame 8 is tiltable to any desired angle from the horizontal to vertical so that the camera may be directed upon the object to be photographed, which may be directly from above, as shown in Figure 1, or at any angle to the horizontal, as it is obvious that the camera may be secured on the mounting for taking pictures from beneath the object with the same angular adjustable control. If the camera lens is found not to be in focus on the object, or if it is impossible to focus the lens on the object by the adjustment of the camera itself, the camera support may then be shifted on the tiltable frame to a point where the proper focus results.

It will also be noted that the device is adapted to be folded in a compact form for packing or transporting the same. To this end the tiltable frame folds upon the base thereof, and the prop rods, which are releasable for bodily shifting, are shifted to a point within the limits of the tiltable frame, the larger of the parts, so that the structure as a whole is in very compact form when so folded, as plainly shown in Figures 2 and 3.

While the above is the preferred form of the invention, it is to be understood that many structural changes may be made therein without departing from the spirit of the invention, and it is to be understood that such changes are included in the invention.

The invention having been set forth, what is claimed as new and useful is:

1. A mounting for cameras comprising a base, a camera support hingedly mounted on said base, rockable tubular members transversely disposed with respect to and carried by said base and camera support and having spaced holes therethrough, prop rods longitudinally disposed with respect to said base and slidable through said holes, screws threaded in one end of said tubular members adapted to engage one of said prop rods, and means disposed in said tubular members between said prop rods adapted to be actuated by and cooperate with said screws to clamp said rods to said tubular members in desired position.

2. A mounting for cameras comprising a base, a camera support hingedly mounted on said base, rockable tubular members transversely disposed with respect to and carried by said base and camera support and having spaced holes therethrough prop rods longitudinally disposed with respect to said base and slidably extending through said holes, screws threaded into one end of said tubular members adapted to engage one of said prop rods, and thrust rods disposed in said tubular members between said prop rods adapted to be actuated by and cooperate with said screws to clamp said rods to said tubular members in desired position.

3. A mounting for cameras comprising a base, camera supporting means hingedly mounted on said base, tubular members rockably carried by said base and camera support and having spaced holes therethrough, prop rod slidably extending through said holes, thrust rods disposed in said tubular members between said prop rods, and screws threaded into one end of said tubular members adapted to engage one of said prop rods and cooperate with said thrust rod to clamp said rods in desired position.

4. A mounting for cameras comprising a base, camera supporting means hingedly mounted on said base, tubular members rockably carried by said base and camera support and having spaced holes therethrough, spaced prop rods slidably extending through said holes, screws threaded endwise into said tubular members adapted to engage one of said prop rods, and means interposed between said prop rods and cooperating with said prop rods and screws to move both prop rods into clamping relation with said tubular members.

5. A mounting for cameras comprising a base, camera supporting means hingedly mounted on said base, rockable transverse tubular members carried by said base and camera supporting means, a longitudinal prop rod slidable through holes in said tubular members, and a screw threaded endwise into each of said tubular members adapted to clamp said rod to said tubular members.

6. A mounting for cameras comprising a base, a camera supporting means hingedly mounted on said base, rockable transverse tubular members carried by said base and camera supporting means, a prop rod slidable through holes in said tubular members, and means adapted to clamp said rod to said tubular members.

In testimony whereof I affix my signature.

OTTO ROACH.